ABSTRACT OF THE DISCLOSURE

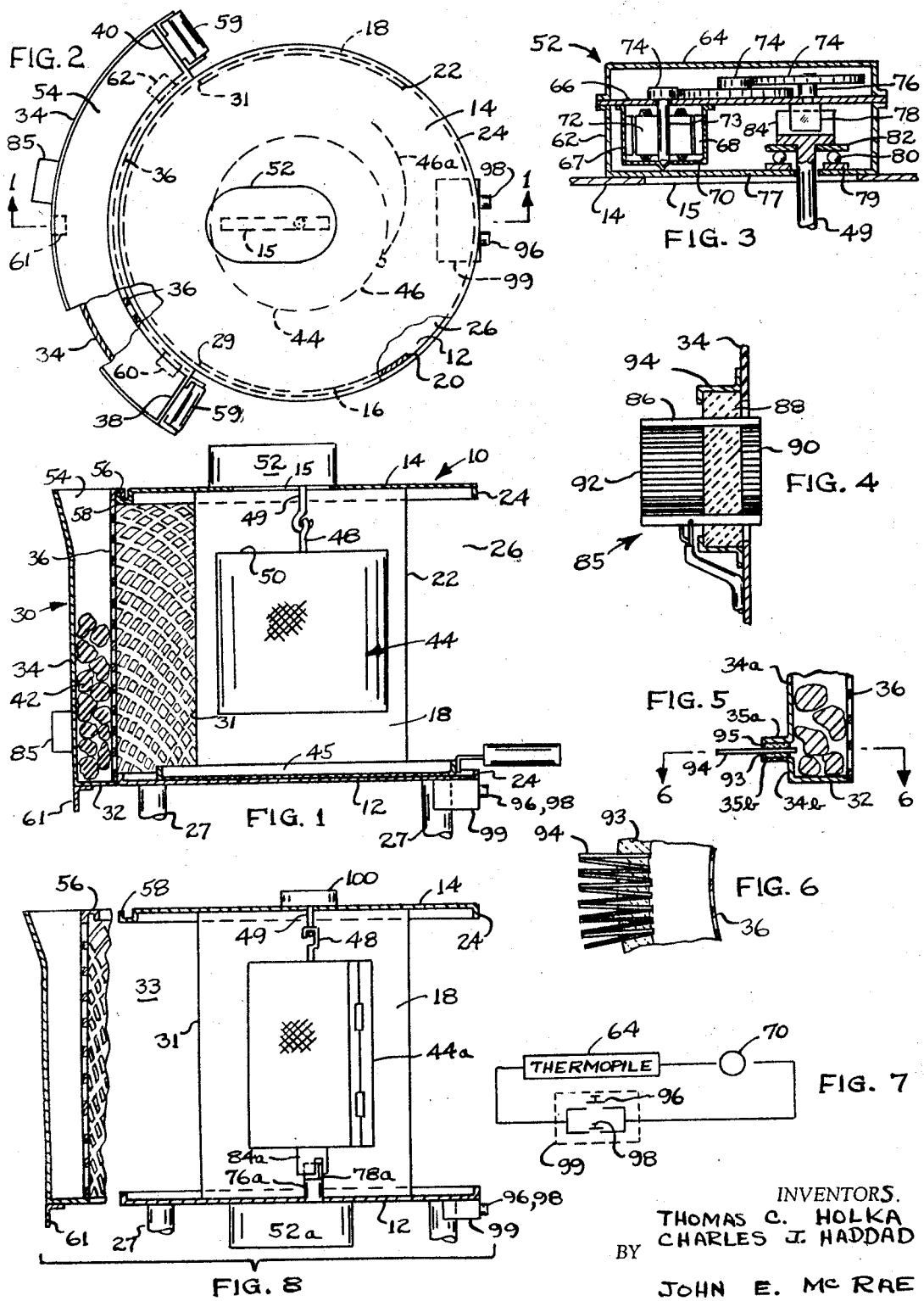
June 10, 1969 — T. C. HOLKA ET AL — 3,448,679
FOOD COOKING APPARATUS
Filed July 1, 1966
INVENTORS.
THOMAS C. HOLKA
CHARLES J. HADDAD
BY JOHN E. McRAE 3,448,679
FOOD COOKING APPARATUS
Thomas Carl Holka, 7581 Dobel, Detroit, Mich. 48234, and Charles J. Haddad, 23320 W. Outer Drive, Allen Park, Mich. 49227
Filed July 1, 1966, Ser. No. 562,264
Int. Cl. A47j 37/07
U.S. Cl. 99—443                                1 Claim

A barbecue apparatus comprising a food support suspended from an overhead thrust bearing for rotation about a vertical axis, said bearing being driven by an electric motor through a clutch element which is supported independently of the bearing.

OBJECTS

One object of the invention is to provide a motorized food-cooking apparatus having a motor means which receives its electric input from a thermo-electric generator subjected to the charcoal or other heat source being used to carry out the cooking operation.

Another object is to provide a barbecue arrangement in which the thermo-electric generator needs to develop only a very small amount of electric energy, thereby enabling the generator to be formed by a relatively small number of thermo-electric junctions.

A further object is to provide a charcoal type heat source which can have charcoal added thereto as needed without affecting the operation of the thermo-electric generator or motorized food support.

An additional object is to provide a charcoal basket arranged adjacent the hood of a barbecue apparatus so that hot exhaust gases are directed away from the food being barbecued.

A further object is to provide a charcoal basket arranged to promote easier fire start-up and draft retention.

Another object is to provide a fire basket which is easily removable from the barbecue for ash disposal.

An additional object is to provide a barbecue wherein the food support may be adjusted toward and away from the heat source to vary the intensity of the cooking operation.

A further object is to provide a barbecue wherein the heat source comprises an upright charcoal basket disposed to leave the space below the food free of charcoal, thereby permitting gravy drippings to be caught in a suitable receptacle.

IN THE DRAWINGS

FIG. 1 is a sectional view through one embodiment of the invention taken on line 1—1 in FIG. 2.

FIG. 2 is a top plan view of the FIG. 1 apparatus.

FIG. 3 is an enlarged sectional view of a motor used in the FIG. 1 apparatus.

FIG. 4 is an enlarged sectional view taken through a thermo-electric generator used in the FIG. 1 apparatus.

FIG. 5 is a sectional view showing a second type of thermo-electric generator which could be used in practicing the invention.

FIG. 6 is a section view taken on line 6—6 in FIG. 5.

FIG. 7 is a diagram of an electric circuit employed in the FIG. 1 apparatus.

FIG. 8 is a sectional view taken through another embodiment of the invention; the fire basket is shown in a partially separated position.

GENERAL ARRANGEMENT

The arrangement comprises an upstanding hood structure 10 having an electrical motor means 52 or 52a disposed to move a foraminous food support 44 or 44a about a vertical axis. A charcoal basket 30 is located adjacent the hood structure to cause heat from the burning coals 42 to radiate horizontally onto the rotating food product.

Motor means 52 or 52a comprises a small electric motor 70 (FIG. 3) which receives its electrical energy input from a thermo-electric generator 85 carried by the fire basket. Heat from the burning coals is translated into usable electrical energy, thus obviating the need for an external power supply.

HOOD STRUCTURE 10

FIG. 1 shows a barbecue food-cooking apparatus comprising an upstanding hood structure 10 provided with a circular bottom wall or pan 12 and a circular top wall 14, said walls being interconnected by two arcuate side wall segments 16 and 18 having front vertical edges 20 and 22 defining an access opening 26. Each of walls 12 and 14 is preferably provided with a peripheral rim or flange 24 for reinforcement purposes. Conventional legs 27 may be provided to support the apparatus at a convenient cooking height. Wall segments 16 and 18 have rear terminal edges 29 and 31 which define an open space 33 for accommodating the charcoal container 30.

CHARCOAL CONTAINER 30

Removably disposed on hood structure 10 is an upstanding charcoal container 30 comprising a bottom wall 32, a rear side wall 34, a front side wall 36 and two end walls 38 and 40. Viewed in plan (FIG. 2) walls 34 and 36 are arcuate. Wall 36 at least is perforated so that heat from the contained burning coals 42 may radiate into the hood structure and onto the food supported within the cylindrical foraminous food basket 44.

FOOD BASKET 44

Preferably basket 44 is perforated at least in its peripheral side wall 46 to permit the heat from coals 42 to penetrate into the food product (chicken, potatoes, hot dogs, ham etc.).

Basket 44 is suspended within hood structure 10 by a pair of interconnected open-ended hooks 48 and 49, one of which extends upwardly from basket top wall 50, and the other of which extends downwardly from an electric motor means 42 carried by hood top wall 14. The basket can be moved to and from its FIG. 1 suspended position by manual movement through access opening 26. A portion of the basket side wall 46 can be formed as a hinged door, as indicated at 46a in FIG. 2, to permit access to the basket interior. Alternately the top wall 50 can be formed as a hinged closure for the necessary access. The basket can be formed of expanded metal, crossed wire construction, or reinforced screen material. A removable pan or receptacle 45 may be positioned below the food basket for collection of drippings used to make gravy.

FIRE START UP AND ASH DISPOSAL

It will be noted that access opening 26 forms a draft source for the burning coals in basket 30. Thus, when the charcoal is ignited draft air flows through opening 26, around food basket 44 and into the perforations in arcuate wall 36. The draft air then flows upwardly through the bed of coals (wholly or partially filling the vertical depth of the basket) and out the basket bell-mouthed open upper end 54. This open end (extending the full arcuate dimension of the basket) acts initially as a loader opening for the charcoal and later as a removal opening for the ashes. Ash disposal is accomplished by turning the basket upside down.

Wall 36 of the fire basket is provided with a hook-like extension 56 at its upper end for cooperative engagement with an upwardly facing hook formation 58 formed integrally with rim 24 of hood top wall 14. As shown in FIG. 8, the fire basket may be completely removed from the hood structure to facilitate the ash removal process. Since the basket may be hot suitable handles 59 are provided on the upper areas of the basket end walls 38 and 40. Also, three suitable angle iron feet 60, 61 and 62 may be secured to basket bottom wall 32 to support the basket on any surface when it is removed from the hood structure. The removable nature of the basket permits the fire to be started remote from the hood structure if wind conditions should so require.

MOTOR OPERATION

As previously noted, food support 44 is adapted to be rotated by motor means 52, shown in some detail in FIG. 3. The motor means comprises a lower housing element 62, an upper housing element 64, and an intermediate partition 66. Secured to the underside of partition 66 is the cup-like casing 67 for the stator 68 of the small electric motor 70. Rotor 72 is carried on a shaft 73 which extends through partition 66. Speed reduction gears 74 are located on the upper surface of the partition to transmit a reduced speed drive to a shaft 76 having a spade-like clutch element 78 carried thereon.

Positioned on wall 77 of housing element 62 is an anti-friction thrust bearing having a stationary race element 79, a ball assembly 80, and a movable race element 82. Element 82 is rigidly secured to the hook structure 49 which is formed integrally with a bifurcated clutch element 84. The arrangement is such that high speed rotation of motor rotor 72 is translated into low speed rotation of clutch elements 78 and 84. The hook 49 rotates with the clutch elements and thus transmits the drive to the subjacent food support 44.

It will be noted that the weight of basket 44 and its contents is not borne by clutch element 78; instead the basket weight is borne by the anti-friction thrust bearing. This arrangement tends to reduce the load on motor 70 and thus facilitates formation of the motor as a small low cost structure; the arrangement also permits greater tolerances on the speed reducer gearing.

Of major importance is the fact that food support 44 is arranged to rotate on a vertical axis. Under conventional barbecue practice the spit or other food support rotates on a horizontal axis. The meat product is not symmetrical about any given axis; hence it is difficult to avoid eccentric loading on the food support and drive means. When the food is rotated about a horizontal axis the eccentric food mass causes the motor to be heavily loaded during parts of the cycle and lightly loaded during other parts of the cycle. The food thus goes through a variable speed flip-flop action during which some food surfaces are heavily cooked (due to prolonged exposure to the charcoal) and some food surfaces are lightly cooked.

A significant disadvantage of the horizontal axis construction is the large power required of the motor, due to such factors as the above-mentioned eccentric loading, common use of sleeve bearings instead of anti-friction bearings, necessity for multiple bearings at opposite ends of the food support shaft, misalignment of the bearings, and torque arm effect due to the outboard line of action of the load. We have found that the vertical axis arrangement as illustrated by FIGS. 1 and 3 requires substantially less motor power than the horizontal arrangement. We believe this is due in part to the fact that any eccentric weight effect in basket 44 merely tilts the basket slightly without changing the line of action of the load. Thus the load acts vertically from the engagement point between hooks 48 and 49, which point is always essentially located on the vertical axis defined by the thrust bearing. The coefficient of rolling friction between the race elements and balls 80 is very low, being on the order of .001. Only one bearing assembly is employed, and there is therefore no bearing misalignment problem.

Preferably motor means 52 is adjustable along wall 14 to vary the spacing between food support 44 and firebasket 30, the purpose being to vary the intensity of heating depending on the nature of the food product being heated. Accordingly wall 14 may be provided with a slot 15 which allows easy lateral adjustment of the motor means 52 and the depending hook 49.

THERMOPILE 85

In the FIG. 1 arrangement the electric motor is energized by a thermo-electric generator 85 carried by the rear wall 34 of the firebasket. The generator is generally similar to the generator shown in U.S. patent application, Ser. No. 287,835, filed June 14, 1963, now Patent No. 3,257,936. FIG. 4 illustrates the generator as having dissimilar series-connected thermo-electric strips 86 extending through a ceramic carrier disk 88 to form relatively hot junctions 90 within the firebasket and relatively cool junctions 92 outside the basket. Disk 88 may be of circular outline, and the thermo-electric strips may be arranged in a circumferential pattern therearound as shown more clearly in the above-mentioned patent application. An annular mounting bracket 94 may be employed to position the generator on wall 34.

FIGS. 5 and 6 illustrate an alternate form of thermoelectric generator. In this arrangement the firebasket rear wall is formed by two separate wall structures 34a and 34b having spaced flanges 35a and 35b forming a narrow slot extending along all or part of the arcuate extent of the basket wall. Two asbestos strips 93 and 95 may be positioned in the slot above and below the thermo-electric strips 86. At spaced points along the length of the slot the flanges 35a and 35b may be embossed toward one another, and the embossments spot welded together to clamp the asbestos-thermo-electric assembly within the basket wall. The FIG. 6 arrangement may have some advantage over FIG. 4 in spacing the cold junctions from one another for improved cooling (higher temperature differential producing more electrical energy per thermocouple).

CONTROL CIRCUITRY

FIG. 7 illustrates a suitable electric circuit having two manually controllable push button switches 96 and 98 disposed within a single casing 99 in parallel circuit relationship. Switch 96 is a conventional push-push switch wherein successive depressions of the button close and open the switch, i.e. on, then off, then on, etc. Switch 96 can thus be employed to start and stop rotation of the food support at the beginning and end of the cooking operation. Switch 98 is a conventional momentary on switch which requires that the push button be held depressed to close the circuit; release of the push button opens the circuit.

Switch 98 is particularly useful when the suitcase type food support 44a (FIG. 8) is employed. Such a support includes two closely spaced flat walls for clamping the food product (hamburgers, hot dogs, etc.) therebetween. By momentarily depressing switch 98 the food support may be rotated through a half cycle to alternately present the different flat faces thereof to the fire.

FIG. 8 EMBODIMENT

FIG. 8 illustrates the driving motor 52a secured to bottom wall 12. In this arrangement the food support is preferably suspended from a thrust bearing 100 formed separately from the motor structure. The reduced speed motor drive comprises an output shaft 76a which carries a spade type clutch element 78a loosely disposed within a bifurcated clutch element 84a carried by food support 44a. Preferably the entire weight of the food support is borne by anti-friction bearing 100 so that motor mechanism 52a is required to overcome only the frictional resistances within the bearing.

The vertical axis arrangements of FIGS. 1 and 8 are advantageous over horizontal axis arrangements in that lesser numbers of thermocouples are required to provide satisfactory power levels. Thus, in one horizontal construction over one hundred thermocouples were required, whereas less than one half that number would be required in the corresponding vertical construction. Comparative tests of the two types indicate a much more uniform rotational velocity with the vertical axis type. Bearing life should be longer with the vertical arrangement.

The lead wiring between the thermopile, motor and switches preferably should be disconnectible at selected points to permit easy removal of the firebasket; suitable plug-socket connections can be employed for this purpose. Metal sheathed wiring should be used for heat insulation against the high temperatures (800° F.) occurring at some of the wall surfaces. With proper design it is believed that the thermopile could be mounted on bottom wall 12 so that its hot junctions automatically are exposed to the burning coals when the firebasket is installed on the hood structure.

As mentioned previously, the illustrated disposition of the food support for movement about a vertical axis significantly reduces the power requirement. This lessened power requirement may make feasible the use of battery type energy sources for the motor. Previously batteries have been proposed for energizing horizontal axis spit-motor arrangements. However the large power requirements and relatively long cooking periods have made such arrangements impractical. The much lower power requirements of the vertical axis arrangements may now make battery power a practical expedient.

We claim:
1. Food cooking apparatus comprising an upstanding hood structure having a peripheral side wall and a top wall cooperatively defining a cooking chamber; a rotary thrust bearing carried by the hood structure top wall so that its rotational axis is vertical; a hook structure depending from the rotary portion of the thrust bearing so that its hook is located within the cooking chamber; a food support removably suspended from the hook so that the entire weight of the food support and food product is borne by the overhead thrust bearing; an electric motor disposed on the hood structure top wall; clutch means between the motor and the rotary portion of the bearing; said clutch means comprising a rotary driver element supported independently of the bearing, and a driven element carried by the rotary portion of the bearing, whereby thrust loads imposed by the food support are totally carried by the bearing; a source of electric energy for the motor; electric conductor means between the energy source and motor; and a source of heat located adjacent the cooking chamber for cooking the food as it rotates about a vertical axis within said chamber.

References Cited

UNITED STATES PATENTS

| | | |
|---|---|---|
| 601,812 | 4/1898 | Michel. |
| 1,018,116 | 2/1912 | Kowalski. |
| 1,733,627 | 10/1929 | Rasmussen et al. __ 99—421 XR |
| 2,581,570 | 1/1952 | Amanatides _____ 99—421 |
| 2,687,080 | 8/1954 | Dorin _____ 99—421 XR |
| 3,079,909 | 3/1963 | Bemben. |
| 3,257,936 | 6/1966 | Holka et al. |
| 3,294,010 | 12/1966 | Zentko. |

FOREIGN PATENTS

| | | |
|---|---|---|
| 19,827 | 7/1935 | Australia. |
| 115,655 | 11/1876 | France. |
| 4,061 | 2/1879 | Germany. |
| 343,997 | 2/1960 | Switzerland. |

WALTER A. SCHEEL, Primary Examiner.

J. M. NEARY, Assistant Examiner.

U.S. Cl. X.R.

99—398, 421; 126—25